United States Patent [19]

Bauer et al.

[11] Patent Number: 4,852,862

[45] Date of Patent: Aug. 1, 1989

[54] FLUID-FILLED PISTON-CYLINDER UNIT

[75] Inventors: Hans-Peter Bauer; Hans J. Bauer, both of Altdorf, Fed. Rep. of Germany

[73] Assignee: Fritz Bauer and Sohne OHG, Altdorf, Fed. Rep. of Germany

[21] Appl. No.: 219,749

[22] Filed: Jul. 15, 1988

[30] Foreign Application Priority Data

Jul. 25, 1987 [DE] Fed. Rep. of Germany ... 8710208[U]

[51] Int. Cl.⁴ .................... F15B 15/14; F16F 9/36; F16J 15/56
[52] U.S. Cl. ................ 267/120; 92/165 R; 92/168; 188/322.17; 267/124
[58] Field of Search ............. 267/120, 64.11, 64.12, 267/129, 124, 64.13, 139, 140; 188/322.17, 129, 300, 318; 92/165 R, 168, 167, 166; 16/84, 82, 66

[56] References Cited

U.S. PATENT DOCUMENTS

| | | | |
|---|---|---|---|
| 3,307,883 | 3/1967 | Wustenhagen et al. | 92/168 X |
| 3,966,182 | 6/1976 | Stadelmann et al. | 267/124 |
| 4,002,106 | 1/1977 | Edmo | 92/168 X |
| 4,071,057 | 1/1978 | Nagase | 188/322.17 X |
| 4,211,151 | 7/1980 | Wallischeck | 92/168 X |
| 4,270,635 | 6/1981 | Wössner | 188/322.17 |
| 4,307,873 | 12/1981 | Möders | 267/124 X |
| 4,386,766 | 6/1983 | Bauer et al. | 267/64.12 |

*Primary Examiner*—Douglas C. Butler
*Attorney, Agent, or Firm*—Browdy and Neimark

[57] ABSTRACT

A fluid-filled piston-cylinder unit with a tubular fluid-filled housing closed at one end and with a piston rod emerging from the other end comprising, for guiding the said piston rod, a guide bush which is sealed on the one hand against the inside wall of the housing and on the other against the piston rod by the use of seals. Provided at the inner end of the piston rod there is a guide piston. In order on the one hand to avoid surface pressure between the piston rod and the guide bush and on the other to achieve an adequate length of guidance for the piston rod itself, the guide bush is provided with at least one spacer extending in axially parallel manner beyond the seals and in the direction of the guide piston and the cross-section of which is substantially smaller than the cross-section of the guide bush.

15 Claims, 3 Drawing Sheets

FLUID-FILLED PISTON-CYLINDER UNIT

FIELD OF THE INVENTION

The invention relates to a fluid-filled piston-cylinder unit, particularly a gas spring or fluid damper with a tubular fluid-filled housing having two ends and being closed at one end and with a piston rod emerging from the other end of said housing, one end of the piston rod which is inside the housing being provided with a guide piston for lateral supporting of the piston rod against the inside wall of the housing, the said piston rod being guided at the other end of the housing in a guide bush comprising an inner seal for sealing tightness against the piston rod and an outer seal for sealing tightness against the inner wall of each of the said seals consisting of a resilient sealing material, and said piston rod being movable in said bush in a direction of a central longitudinal axis.

BACKGROUND OF THE INVENTION

Where these prior art units are concerned, the guide bush serves on the one hand to guide the piston rod while on the other the piston rod bears on the inside wall of the cylinder through its guide piston. To avoid excessive surface pressure due to not absolutely accurate alignment between the bore of the guide bush and the cylindrical inner wall of the housing, the guide bush, i.e. its guiding length, should not be too long, particularly if the piston rod with the guide piston is retracted relatively far into the housing. On the other hand, the guiding length should not be too small when the piston rod is substantially or completely extended out of the housing, in other words until the guide piston bears against the guide bush. Another factor against having a long guide bush is once again, particularly if the piston-cylinder unit is constructed as a gas spring the fact that gas space is lost and yet it is the gas space which is important to achieving the flattest possible characteristic curve for the gas spring.

SUMMARY OF THE INVENTION

Therefore it is an object of the invention to develop a piston-cylinder unit of the type mentioned at the outset such that surface pressures between the piston rod and the guide bush are avoided while at the same time an adequate length of guidance for the piston rod itself is achieved.

According to the invention the guide bush is provided with at least one spacer extending parallel to said axis and beyond the said seals, in a direction to the guide piston, the said spacer having a cross-section which is considerably smaller than the cross-section of the guide bush. The spacer or spacers limit(s) the travel of the piston rod with the guide piston out of the housing, i.e. it is ensured that the piston rod-guide piston unit has a guiding length which is substantially determined by the total length of the guide bush with the spacers, against which the guide piston which is supported against the inside wall of the housing comes to bear. By virtue of the fact that the spacer or spacers has (have) a cross-section which constitutes only a fraction of the cross-section of the guide bush, the housing interior in the axial region of the spacer or spacers is available for pressurised gas, lubricaring oil or damping fluid.

The spacer can be constructed in one piece, for example as a thin-walled annular cylinder. However, a plurality of spacers may be provided which are disposed at substantially equal angular intervals, so that saving on material and thus the gain in space can be further increased.

The development which has one or a plurality of spacers permits of the further improvements according to which the seals are in a transition zone from the guide bush to the at least one spacer, fixed in a directly surface-containing manner, since an individual disposition of an inner seal and an outer seal on the guide bush necessitated a considerable outlay on machining work. The direct surface fitment, for example by integral injection moulding, vulcanising or the like, provides considerable advantages. Particularly a further development, according to which the seals are constructed as a one-piece sealing member, is of special importance in this connection, particularly if there are a plurality of spacers. Thus, all the problems which might lead to lack of fluid tightness are overcome, because the spacers in the sealing zone constitute at the same time interference points, It is especially preferable to have a sheath on the spacer or spacers which can at the same time be constructed as an abutment buffer for the guide piston. This at least one sheath on the at least one spacer provides a complete seal on the sealing body constituted by the inner seal and the outer seal and also in the region of spacer penetration.

The total cross-section of the spacers may be considerably smaller than the solid cross-section of the guide bush.

Further advantages and features of the invention will become evident from the ensuing description of examples of embodiment, taken in conjunction with the drawings.

DESCRIPTION OF PREFERRED EMBODIMENT

Figure 1:
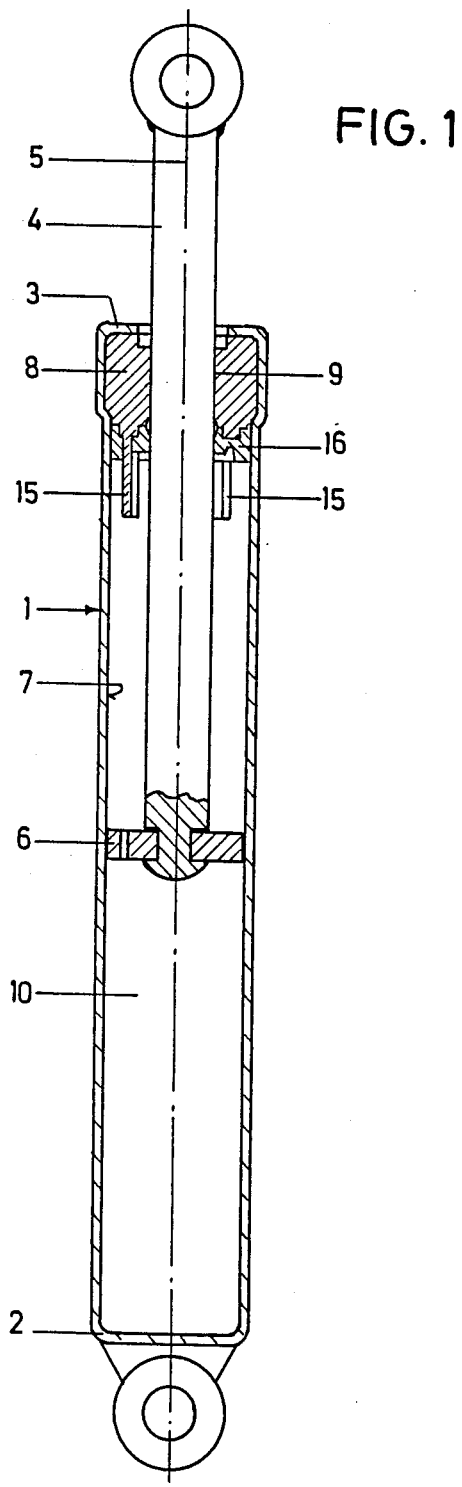
FIG. 1 is a longitudinal section through a piston-cylinder unit according to the invention.

The piston-cylinder unit constructed as a gas spring and shown in FIG. 1 has a substantially cylindrical housing 1 produced from a tube and constructed to be closed at one end 2. Emerging from the outer end 3 of the housing 1 is a cylindrical piston rod 4 which is disposed coaxially of the central longitudinal axis 5 of the housing 1. At its end which is disposed in the housing 1, the piston rod 4 comprises a guide piston 6 which is constructed in conventional manner as a guide and damping piston, the details of its construction not being important at this time. This guide piston 6 has at least a part of its outer periphery supported against the inner wall 7 of the housing 1.

The piston rod 4 is guided at the end 3 of the housing 1 in a guide bush 8, of which the bore 9 of the piston rod 4 which extends coaxially with the axis 5 and which accommodates the piston rod 4 is so adapted to the piston rod 4 that the latter is guided in the bore 9. The guide bush 8 is axially fixed in the housing 1.

At its end face which is towards the interior 10 of the housing 1, in other words towards the guide piston 6, the guide bush 8 comprises an annular web 11 between (see FIG. 2) the outer peripheral face 12 of which and the inner wall 7 of the housing 1 there is a clear space. Equally, the inner peripheral face 13 of the annular web 11 is offset outwardly in respect of the bore 9 so that here, too, a free space is formed.

From the end 14 bounding the annular web 11 in respect of the interior 10, spacers 15 extend parallel with the axis 5 and into the interior 10, in the direction of the guide piston 6. As is evident from FIG. 3, they are in each case constructed in the form of portions an annular cylinders.

Figure 2:
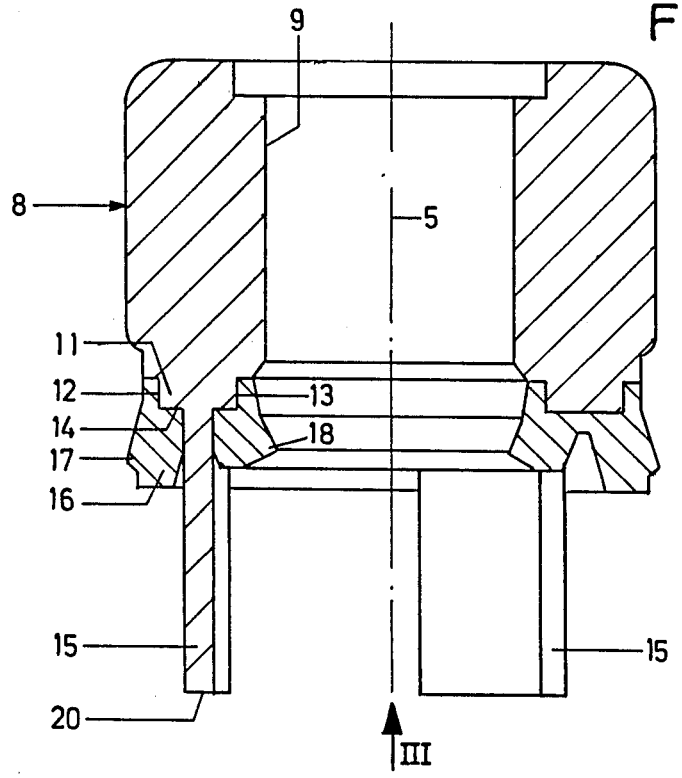
FIG. 2 shows a guide bush with a plurality of spacers in longitudinal section

On the annular web 11 and in fact on its end face 14 and its peripheral faces 12, 13, a sealing member 16 consisting of a resilient sealing material such as suitable grades of rubber or suitable synthetic plastics materials, is fixed by an integral injection moulding or vulcanising process. Constructed on this sealing member 16 is an outer seal 17 which bears in sealing tight manner against the inner wall 7 of the housing 1 and an inner seal 18 which bears in sealing tight manner against the piston rod 4. As FIG. 2 shows, this sealing member 16 has its surface fixed on the outer peripheral face 12, the inner peripheral face 13, the end face 14 of the annular web 11, whereever there are no spacers 15, and the root portions of the spacers 15, so that an extremely reliable sealing effect is achieved.

Figure 3:
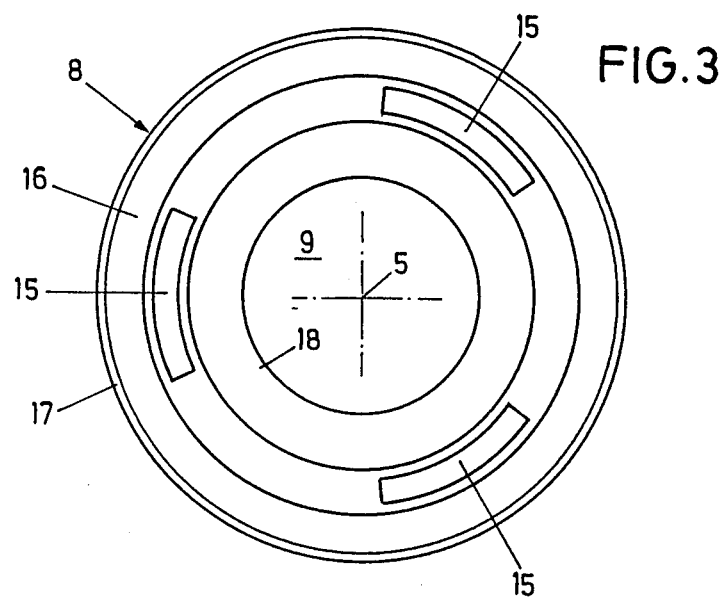
FIG. 3 shows a plan view of the guide bush according to the arrow III in FIG. 2.

As FIG. 3 shows, the cross-sectional area of the three spacers 15 is smaller by at least one power of ten than the cross-sectional area of the guide bush 8, so that a substantial part of the interior 10 of the housing 1 is available over the length of the spacers 15 as a free space for a gas filling or for a filling of lubricating oil. The solid cross-section of the guide bush 8 is desirably at least three times larger than the total cross-section of the spacers 15, preferably at least five times larger, more preferably at least eight times larger and most preferably at least ten times larger.

Figure 4:
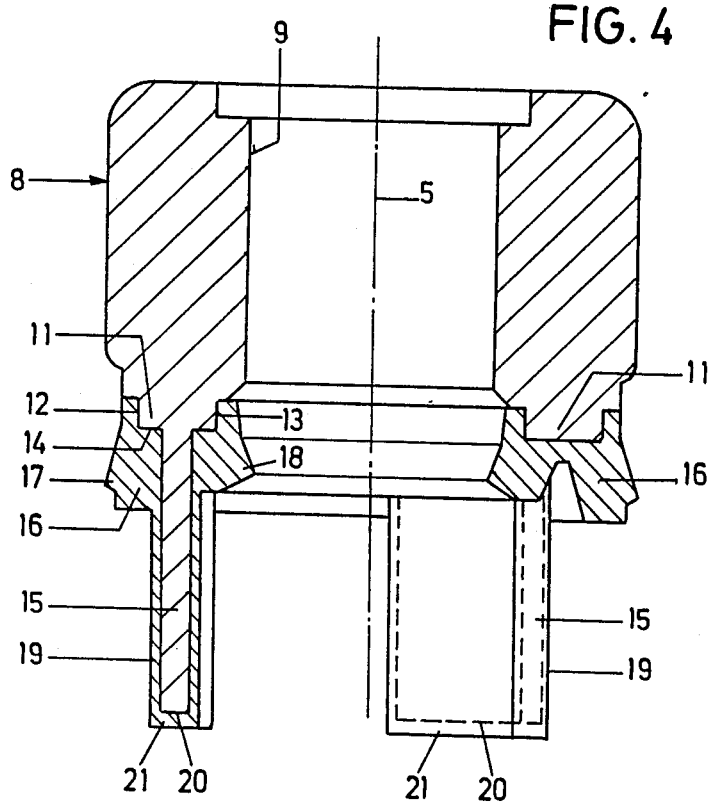
FIG. 4 shows a guide bush in longitudinal section with spacers provided with a sheath.

As emerges from FIG. 4, the spacers 15 in this development are each provided with a sheath 19 constructed integrally with the sealing members 16 and constructed in the region of the relevant end face 20 of each spacer 15 to serve as an abutment buffer 21 for the guide piston 6.

What is claimed is:

1. A fluid-filled piston-cylinder unit, particularly a gas spring or fluid damper, with a tubular fluidfilled housing (1) having two ends (2, 3) and being closed at one end (2) and with a piston rod (4) emerging from the other end (3) of said housing, one end of the piston rod (4) which is inside the housing (1) being provided with a guide piston (6) for lateral supporting of the piston rod (4) against the inside wall (7) of the housing (1), the said piston rod (4) being guided at the other end (3) of the housing (1) in a guide bush (8) comprising an inner seal (18) for sealing tightness against the piston rod (4) and an outer seal (17) for sealing tightness against the inner wall (7) each of the said seals consisting of a resilient sealing material and said piston rod (4) being movable in said bush (8) in a direction of a central longitudinal axis (5), wherein the guide bush (8) is provided with at least one spacer (15) extending parallel to said axis (5) and beyond the said seals (17, 18) in a direction to the guide piston (6), the said spacer (15) having a cross-section which is considerably smaller than the cross-section of the guide bush (8);
wherein a plurality of spacers (15) are provided which are disposed at substantially equal angular intervals;
said seals (17, 18) are in a transition zone from the guide bush (8) to said spacers (15), fixed in a directly surfacecontacting manner; and
said seals (17, 18) are constructed as a one-piece sealing member (16).

2. A unit according to claim 1, wherein a plurality of spacers (15) are provided which are disposed at substantially equal angular intervals.

3. A unit according to claim 1, wherein the seals (17, 18) are in a transition zone from the guide bush (8) to the at least one spcer (15), fixed in a directly surface-contacting manner.

4. A unit according to claim 3, wherein the seals (17, 18) are constructed as a one-piece sealing member (16).

5. A unit according to claim 4, wherein the at least one spacer (15) is provided with a sheath (19) consisting of the material of the sealing member (16) and constructed in one piece with the sealing member (16).

6. A unit according to claim 5, wherein the sheath (19) is constructed on an end face (20) of the at least one spacer (15) which is faced to the guide piston (6) and which serves as an abutment buffer (21).

7. A unit according to claim 1, wherein a solid crossection of the guide bush (8) is at least three times larger than a total cross-section of the spacers (15).

8. A unit according to claim 1, wherein a solid cross-section of the guide bush (8) is at least five times larger than a total cross-section of the spacers (15).

9. A unit according to claim 1, wherein a solid cross-section of the guide bush (8) is at least eight times larger than a total cross-section of the spacers (15).

10. A unit according to claim 1, wherein a solid cross-section of the guide bush (8) is at least ten times larger than a total cross-section of the spacers (15).

11. A fluid-filled piston-cylinder unit, particularly a gas spring or fluid damper, with a tubular fluid-filled housing (1) having two ends (2, 3) and being closed at one end (2) and with a piston rod (4) emerging from the other end (3) of said housing, one end of the piston rod (4) which is inside the housing (1) being provided with a guide piston (6) for lateral supporting of the piston rod (4) against the inside wall (7) of the housing (1), the said piston rod (4) being guided at the other end (3) of the housing (1) in a guide bush (8) comprising an inner seal (18) for sealing tightness against the piston rod (4) and an outer seal (17) for sealing tightness against the inner wall (7) each of the said seals consisting of a resilient sealing material and said piston rod (4) being movable in said bush (8) in a direction of a central longitudinal axis (5), wherein the guide bush (8) is provided with at least one spacer (15) extending parallel to said axis (5) and beyond the said seals (17, 18) in a direction to the guide piston (6), the said spacer (15) having a cross-section which is considerably smaller than the cross-section of the guide bush (8);
wherein said seals (17, 18) are in a transition zone from the guide bush (8) to the at least one spacer (15), fixed in a directly surface-contacting manner, and are constructed as a one-piece sealing member 16; and
said at least one spacer (15) is provided with a sheath (19) consisting of the material of the sealing member (16) and constructed in one-piece with said sealing member (16), said sheath (19) being constructed on and end face (20) of the at least one spacer (15) which is facing toward the guide piston (6) and which serves as an abutment buffer (21).

12. A unit according to claim 11, wherein a solid cross-section of the guide bush (8) is at least three times larger than a total cross-section of the at least one spacer (15).

13. A unit according to claim 11, wherein a solid cross-section of the guide bush (8) is at least five times larger than a total cross-section of the at least one spacer (15).

14. A unit according to claim 11, wherein a solid cross-section of the guide bush (8) is at least eight times larger than a total cross-section of the at least one spacer (15).

15. A unit according to claim 11, wherein a solid cross-section of the guide bush (8) is at least ten times larger than a total cross-section of the at least one spacer (15).

* * * * *